US012570060B2

(12) United States Patent
Simonelli

(10) Patent No.: US 12,570,060 B2
(45) Date of Patent: Mar. 10, 2026

(54) TIRE VULCANIZATION CHAMBER

(71) Applicant: COMPAGNIE GENERALE DES ETABLISSEMENTS MICHELIN, Clermont-Ferrand (FR)

(72) Inventor: Thomas Simonelli, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/694,223

(22) PCT Filed: Sep. 12, 2022

(86) PCT No.: PCT/FR2022/051711
§ 371 (c)(1),
(2) Date: Mar. 21, 2024

(87) PCT Pub. No.: WO2023/047040
PCT Pub. Date: Mar. 30, 2023

(65) Prior Publication Data
US 2025/0135739 A1     May 1, 2025

(30) Foreign Application Priority Data
Sep. 22, 2021     (FR) ..................................... 2109957

(51) Int. Cl.
*B29D 30/06*     (2006.01)
(52) U.S. Cl.
CPC .. *B29D 30/0606* (2013.01); *B29D 2030/0607* (2013.01); *B29D 2030/0666* (2013.01)

(58) Field of Classification Search
CPC ........... B29D 30/0606; B29D 30/0662; B29D 2030/0607; B29D 2030/0666; B29D 2030/0667; B29D 2030/067; B29D 2030/0671; B29D 2030/0673
USPC ....................................................... 425/28.1
See application file for complete search history.

(56) References Cited

U.S. PATENT DOCUMENTS 2,997,740 A     8/1961     Soderquist
5,127,811 A     7/1992     Trethowan
(Continued)

FOREIGN PATENT DOCUMENTS

DE     102015013441 B3 *  2/2017
DE     102014018639 B4 *  6/2021     ............... B60C 5/12
(Continued)

OTHER PUBLICATIONS

Cambon J, FR-2990150-A1, machine translation. (Year: 2013).*
(Continued)

*Primary Examiner* — Sedef E Paquette
(74) *Attorney, Agent, or Firm* — VENABLE LLP

(57)     ABSTRACT
A chamber for vulcanizing a tire comprises filamentary load-bearing elements arranged within the internal cavity, the chamber being delimited by an operating upper plate and a lower plate, the two beads of the tire being fastened to the circumference of the plates, the interior of the chamber having a vertical axis XX' and horizontal axis YY' passing through the center, and comprising at least one heater, a circulation blower for circulating a heat-transfer fluid, and a deflecting first portion and a second portion for directing the flow of heat-transfer fluid.

7 Claims, 3 Drawing Sheets

(56)  References Cited

U.S. PATENT DOCUMENTS

| | | | | |
|---|---|---|---|---|
| 5,683,643 | A | * | 11/1997 | Laurent .............. B29D 30/0662 |
| | | | | 264/315 |
| 6,332,999 | B1 | | 12/2001 | Caretta |
| 8,105,062 | B2 | | 1/2012 | Cain |
| 10,124,550 | B2 | | 11/2018 | Massoptier-David et al. |
| 2008/0224365 | A1 | | 9/2008 | Cain |
| 2012/0164254 | A1 | | 6/2012 | Cain |
| 2021/0162808 | A1 | * | 6/2021 | Girard ..................... B60C 19/00 |

FOREIGN PATENT DOCUMENTS

| | | | | | |
|---|---|---|---|---|---|
| EP | 0368546 | A1 | | 5/1990 | |
| FR | 2990150 | A1 | * | 11/2013 | ......... B29D 30/0662 |
| JP | S59167243 | A | * | 9/1984 | |
| WO | 2008/112916 | A1 | | 9/2008 | |
| WO | 2013/164282 | A1 | | 11/2013 | |
| WO | WO-2019092343 | A1 | * | 5/2019 | ............. B60C 13/00 |
| WO | WO-2019115917 | A1 | * | 6/2019 | ............. B60C 19/00 |

OTHER PUBLICATIONS

Klinger T, DE-102014018639-B4, machine translation (Year: 2021).*
Morival S, WO-2019092343-A1, machine translation. (Year: 2019).*
Schmidt O, DE-102015013441-B3, machine translation. (Year: 2017).*
Kazumasa Sarumaru, JP-S59167243-A, machine translation. (Year: 1984).*
International Search Report dated Dec. 21, 2022, in corresponding PCT/FR2022/051711 (4 pages).

* cited by examiner

[Fig 1]
PRIOR ART
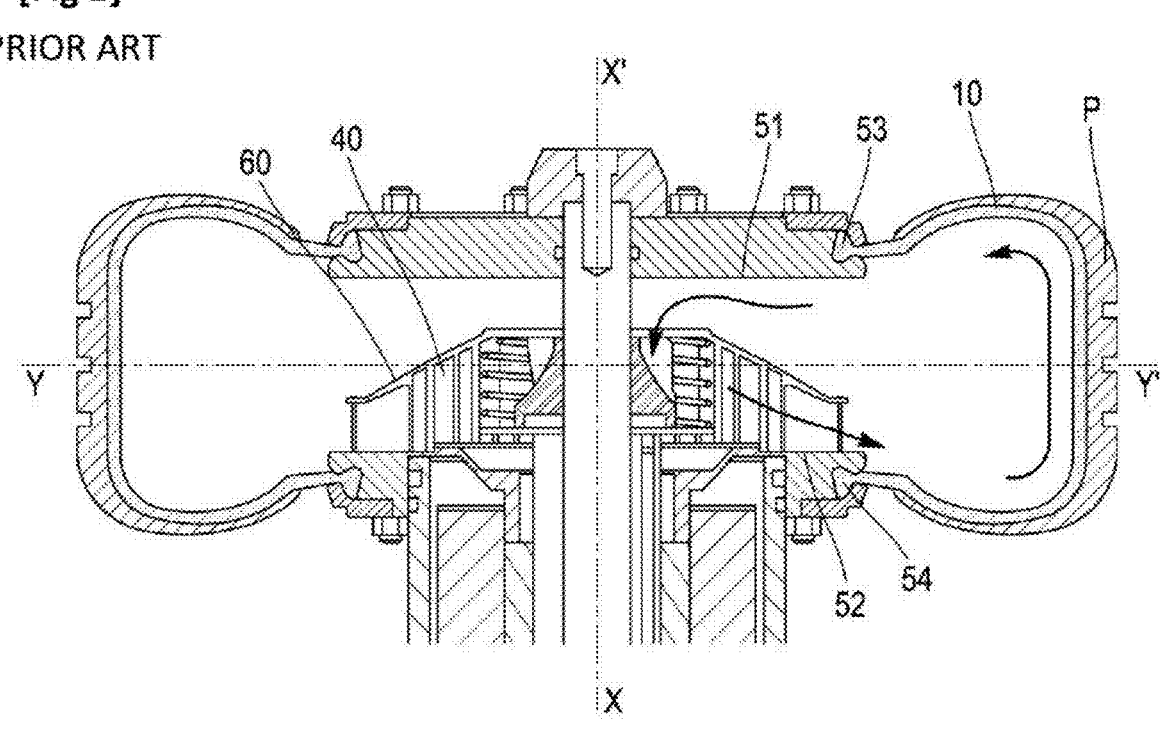
[Fig 2]
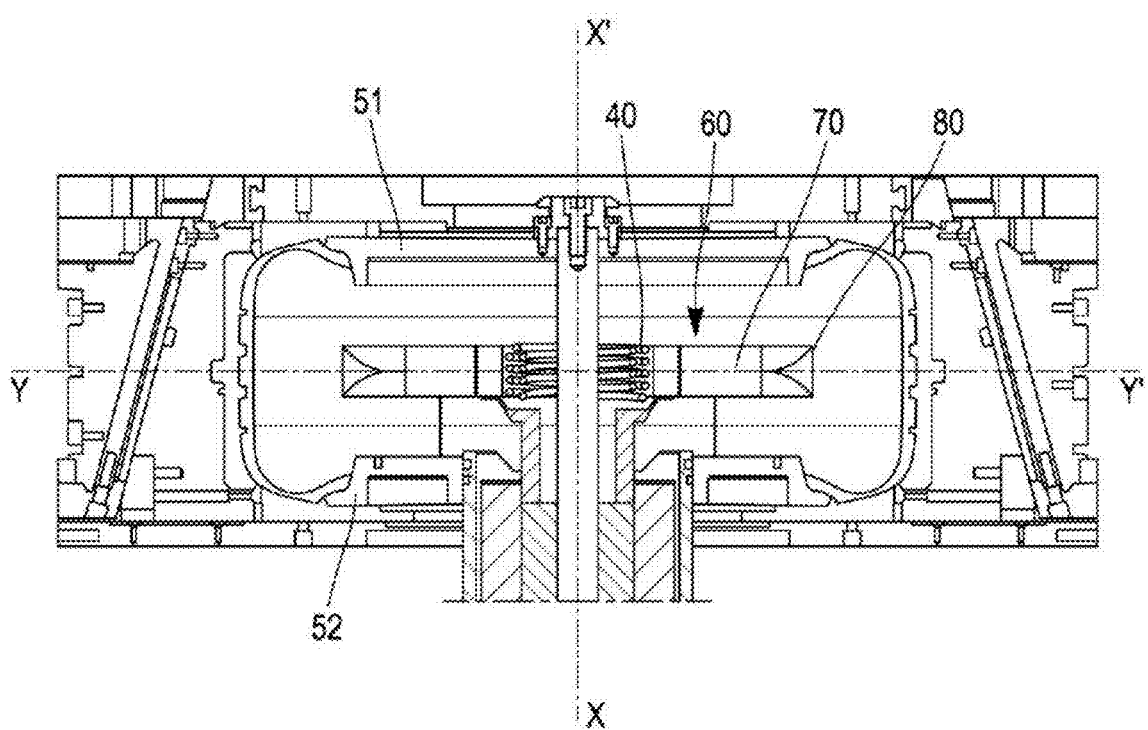

[Fig 3]
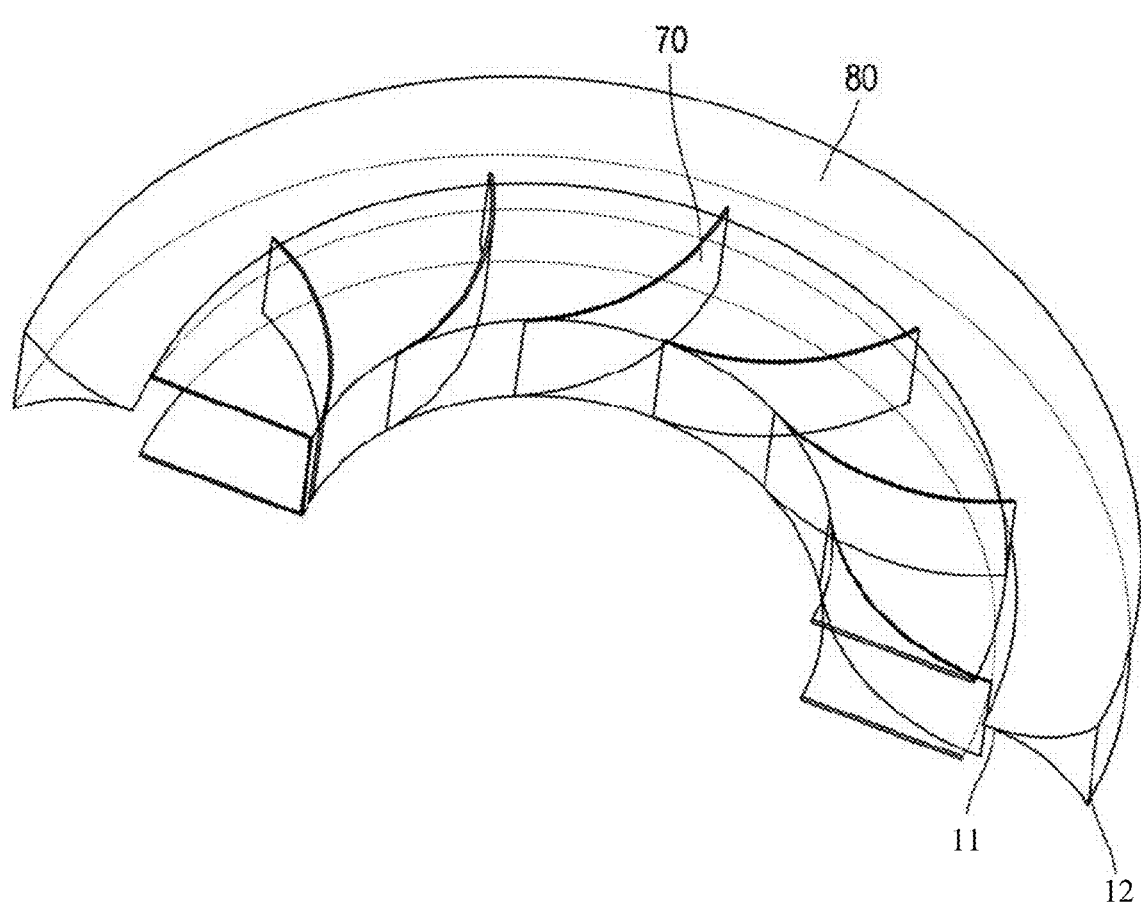

[Fig 4]
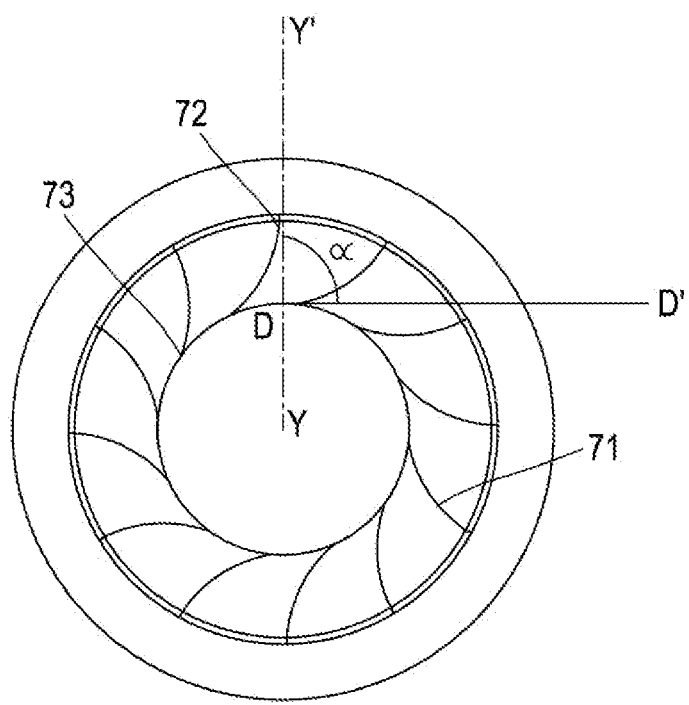
[Fig 5]
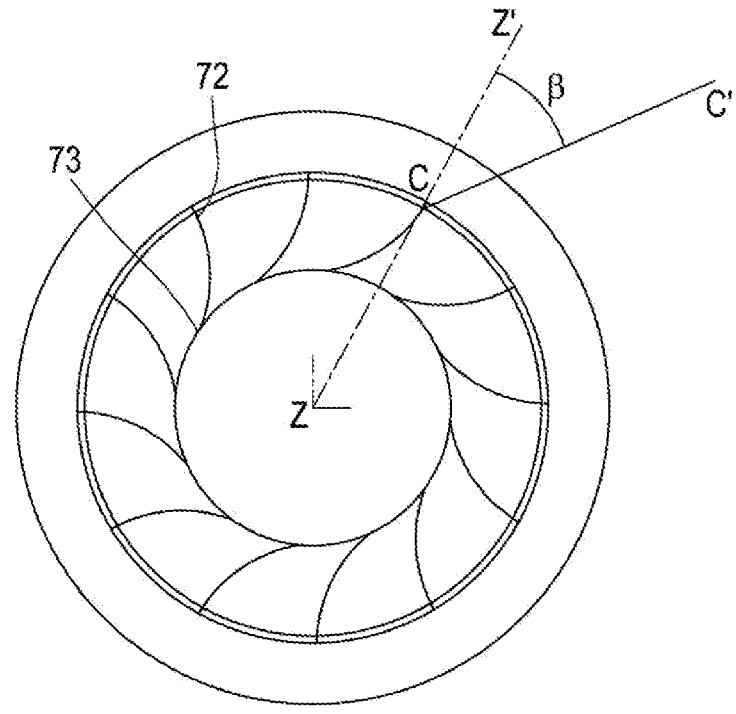

TIRE VULCANIZATION CHAMBER

BACKGROUND

The invention relates to a tyre vulcanization chamber.

Document WO 2013/164282 A1 discloses a tyre vulcanization chamber comprising an upper plate, a lower plate, a curing bladder, a heat-transfer fluid (nitrogen) blower and means for channeling the flow of fluid. Unfortunately, such vulcanization chambers cannot be used to vulcanize tyres comprising independent filamentary load-bearing elements that are regularly arranged in a continuous manner within the internal cavity of the tyre, from the crown of the tyre to a flexible base anchored to the bead of the tyre, such as those described in WO 2019/092343 A1.

Moreover, such a vulcanization chamber without a bladder for vulcanizing these tyres results in an inefficient passage of the nitrogen through the filamentary load-bearing elements, and consequently in poor-quality vulcanization of the tyre.

A reminder of the definitions used in the present invention is given below:

"axial direction" is a direction parallel to the axis of rotation of the tyre,

"radial direction" is a direction that intersects the axis of rotation of the tyre and is perpendicular thereto, "circumferential direction" is a direction perpendicular to a radius and contained in a plane perpendicular to the axis of rotation of the tyre, "radial section" is a section in a plane that contains the axis of rotation of the tyre, "equatorial plane" is the plane perpendicular to the axis of rotation and passing through the middle of the tread.

Therefore, there is still the need for a chamber that allows a tyre comprising filamentary load-bearing elements in its internal cavity to be vulcanized efficiently, quickly and perfectly uniformly.

SUMMARY

The subject of the invention is a chamber for vulcanizing a tyre that comprises filamentary load-bearing elements arranged within the internal cavity, said chamber being delimited by an operating upper plate and a lower plate, the two beads of said tyre being fastened to the circumference of said plates, the interior of the chamber having a vertical axis XX' and horizontal axis YY' passing through the centre and comprising at least one heating means, a circulation blower for circulating a heat-transfer fluid, and a directing means for directing the flow of heat-transfer fluid.

The chamber is characterized in that the circulation blower is arranged at the centre of the chamber, at the intersection of the axes XX' and YY', so as to direct the flow of heat-transfer fluid along the axis YY', in that the directing means for directing the flow of heat-transfer fluid is arranged at the outlet of the blower, said directing means comprising a first portion comprising deflectors, each having an inlet end and an outlet end, each of said deflectors deflecting the flow of heat-transfer fluid by an angle $\alpha$, said angle $\alpha$ being the result of the tangency of an axis VV' passing through the inlet end of a deflector and through the centre of the chamber and of an axis DD' tangential to the inlet end of the same deflector, and a second portion separating said deflected flow into two substantially equal half-flows by an angle $\beta$, said angle $\beta$ being the result of the tangency of an axis ZZ' passing through the outlet end of a deflector and the centre of the chamber, and of an axis CC' passing through the outlet end of the same deflector, and in that the heat-transfer fluid is nitrogen or air.

The chamber according to the invention has the advantage of dividing the flow of heat-transfer fluid into two substantially identical flows, which allows each of the two flows to simultaneously and optimally reach the entire volume of the tyre masked by the filamentary load-bearing elements and therefore allows vulcanization to be carried out within periods of time equivalent to those known hitherto, and consequently without excessive consumption of energy. Dividing the flow of heat-transfer fluid makes it easier and quicker for said flow to reach the filamentary elements.

Commonly used vulcanization chambers comprise a vulcanization bladder intended to place the heat from the heat-transfer fluid in contact with the entire internal surface of the tyre. However, such vulcanization modes cannot be used with a tyre comprising filamentary load-bearing elements arranged within the internal cavity. Specifically, the vulcanization bladder cannot be expanded within the cavity of such a tyre during vulcanization, on account of the presence of the filamentary elements, as this would risk damaging the filamentary structure as well as the vulcanization bladder of the vulcanization chamber, and would consequently result in the tyre not being vulcanized.

The filamentary elements of these tyres are regularly spaced apart within the internal cavity of the tyre, thus creating fixed circulation paths for the heat-transfer fluid. The presence of these paths necessitates uniform circulation of the heat-transfer fluid in order to efficiently vulcanize the internal portions of the tyre, which are partially obstructed by the filamentary elements. However, these paths create volumes that are not easily accessed by the heat-transfer fluid. The directing means for directing the heat-transfer fluid according to the invention makes it possible to reach said volumes easily and quickly, and to do so without reducing the speed of the flow.

Finally, using a heat-transfer fluid, such as nitrogen according to the invention, prevents, unlike steam, the cords forming the filamentary load-bearing elements from being damaged during vulcanization.

Preferably, the first portion of the directing means comprises between 10 and 20 deflectors deflecting the flow of heat-transfer fluid.

Preferably, the angle $\alpha$ is between 45 and 90 degrees, and the angle $\beta$ is between 5 and 45 degrees.

Preferably, the second portion of the directing means has a substantially circular shape having a substantially circular first end diameter D1 that is between approximately 200 and 360 mm, and a substantially circular second end diameter D2 that is between approximately 300 and 470 mm.

Preferably, the second portion of the directing means has a substantially circular shape having a substantially circular first end with a diameter D1 equal to 220 mm, and a substantially circular second end with a diameter D2 equal to 360 mm.

Preferably, the flow of heat-transfer fluid, which is selected from among known fluids for vulcanizing tyres, has a speed of approximately 20 m/s at the outlet of the blower.

Preferably, the flow of heat-transfer fluid has a speed of between approximately 6 and 7 m/s in the internal cavity of the tyre. This speed is the speed measured immediately after passing the filamentary elements, which provide a slight resistance.

BRIEF DESCRIPTION OF THE FIGURES

The invention will be described with the aid of the following figures, which are schematic and not necessarily to scale, and in which:

FIG. 1 depicts a schematic cross-sectional view of a vulcanization chamber according to the prior art, FIG. 2 depicts a schematic cross-sectional view of a vulcanization chamber according to the invention, FIG. 3 depicts a schematic 3D view of the directing means of the vulcanization chamber according to the invention, FIGS. 4 and 5 depict a schematic top view of the directing means of the vulcanization chamber according to the invention.

DETAILED DESCRIPTION

As shown in FIG. 1 from the prior art, the vulcanization chamber comprises an upper plate 51 and a lower plate 52, which are connected by an elastic vulcanization bladder 10, the two beads 53 and 54 of the tyre P of which are anchored to the circumference of said plates 51, 52 and are pressed against the internal portion of the tyre under the effect of the pressure of the heat-transfer fluid. The internal chamber collaborates in a known manner with a rigid mould that is intended to provide said tyre with its final geometric shape and is in particular formed of two shells (not depicted) intended to mould the sidewalls and the tread of the tyre.

This chamber according to the prior art further comprises heating means and a circulation blower 40 for circulating heat-transfer fluid, which are arranged internally. This chamber is delimited by the curing bladder 10 when it is expanded using the pressurized heat-transfer fluid, and by the internal portions of an upper plate 51 and of an operating plate 52. In this prior-art depiction, the chamber comprises a directing means 60 for directing the heat-transfer fluid, said directing means being arranged directly at the outlet of the circulation blower 40.

The chamber illustrated in FIG. 2 according to the invention is distinguished from the chamber from the prior art in that it does not comprise an elastic bladder and in that the heat-transfer fluid is nitrogen. The circulation blower 40 is arranged at the centre of the chamber, at the intersection of the axes XX' and YY'. It is not attached to the lower plate 52. Such an arrangement of the blower 40 makes it possible to re-centre the flow of nitrogen in order to send it in a more uniform manner towards the entirety of the internal wall of the tyre.

The outlet of the blower 40 comprises a directing means 60 for directing the nitrogen, consisting of a first portion 70 intended to deflect the flow of nitrogen at the outlet of the blower 40 by an angle $\alpha$ of approximately 30 degrees. This first deflection of the flow of nitrogen facilitates projecting the flow towards the two shoulders of the tyre. Furthermore, the directing means 60 comprises a second portion 80 intended to separate the deflected flow of nitrogen into two substantially equal flows such that each half-flow of nitrogen has an optimized passage through the lines of filamentary load-bearing elements and consequently heats the tyre correctly. Such an arrangement of the first 70 and second 80 portions of the directing means 60 allows vulcanization times to be achieved that are very similar to those obtained for conventional tyres.

This distribution of the heat-transfer fluid into two equivalent flows allows for an optimum distribution of heat and consequently for correct vulcanization.

The optimum diffusion of the flow of nitrogen is thus achieved by virtue of a directing means 60 arranged directly at the outlet of the circulation blower in order to allow the flow of heat-transfer fluid to correctly and efficiently gain access to the space delimited by the radially internal surface of the carcass ply and the radially external surface of the filamentary elements, and consequently prevents the filamentary elements of the tyre from being damaged during vulcanization.

As shown in FIG. 3, the directing means 60 for directing the heat-transfer fluid comprises a deflecting first portion 70, which is arranged immediately at the outlet of a blower (not depicted), and a second portion 80 arranged at the outlet of said first portion 70.

The second portion 80 has a circular shape, with a substantially frustoconical cross section. The second portion 80 comprises a substantially circular first end 11 with a diameter D1 approximately equal to 360 mm, and a substantially circular second end 12 with a diameter D2 approximately equal to 470 mm. The second portion 80 consists of a material selected in particular from steel or any other suitable material.

The second portion 80 is a solid or hollow structure. The flow of the heat-transfer fluid has a propagation speed of approximately 20 m/s at the outlet of the blower 40, and a propagation speed of each of the two deflected flows of approximately 6 m/s in the internal cavity of a tyre of size 245/45 R18. The curing time for such a tyre is approximately 10 minutes.

This directing means 60 of the chamber according to the invention allows the heat-transfer fluid to be separated into two flows such that the heat optimally reaches the internal wall of the tyre and therefore allows for vulcanization within the curing period required for the size of tyre selected, without any degradation caused by an excessively high temperature and/or an excessively long curing time.

FIG. 4 depicts the location of the angle $\alpha$ with respect to the axes VV' and DD'. The axis VV' passes through the outlet end 72 of a deflector 71 of the first portion 70 and through the centre of the chamber. The axis DD', which is tangential to the inlet end of the deflector, passes through the inlet end 73 of a deflector 71 of the first portion 70.

FIG. 5 depicts the location of the angle $\beta$ with respect to the axes ZZ' and CC'. The axis ZZ' passes through the centre of the chamber and through the outlet end 72 of a deflector 71. The axis CC' passes through the outlet end 72 of a deflector 71 and the tangent of the inlet end 73 of the same deflector.

The invention claimed is:

1. A chamber for vulcanizing a tire that comprises filamentary load-bearing elements arranged within an internal cavity, the chamber being delimited by an upper plate and a lower plate, two beads of the tire being fastened to a circumference of the upper plate and the lower plate, an interior of the chamber having a vertical axis XX' and horizontal axis YY' passing through a center of the chamber, and comprising at least one heating means, a circulation blower for circulating a heat-transfer fluid, and a directing means for directing a flow of the heat-transfer fluid, wherein the circulation blower is arranged at the center of the chamber, at an intersection of the vertical axis XX' and the horizontal axis YY', so as to direct the flow of heat-transfer fluid along the horizontal axis YY', wherein the directing means for directing the flow of the heat-transfer fluid is arranged at an outlet of the circulation blower, the directing means comprising a first portion comprising deflectors, each having an inlet end and an outlet end, each of the deflectors deflecting the flow of the heat-transfer fluid by an angle $\alpha$, the angle $\alpha$ being a result of a tangency of an axis VV' passing through the inlet end of a deflector and through the center of the chamber and of an axis DD' tangential to the inlet end of the same deflector, and a second portion separating the flow, after being deflected, into two substantially equal half-flows by an angle β, the angle β being a result of a tangency of an axis ZZ' passing through the outlet end of a deflector and the center of the chamber, and of an axis CC' passing through the outlet end of the same deflector, wherein the heat-transfer fluid is nitrogen or air, and wherein the chamber does not comprise an elastic bladder.

2. The chamber according to claim 1, wherein the first portion of the directing means comprises between 10 and 20 deflectors deflecting the flow of heat-transfer fluid.

3. The chamber according to claim 1, wherein the angle α is between 45 and 90 degrees, and the angle β is between 5 and 45 degrees.

4. The chamber according to claim 1, wherein the second portion of the directing means has, with respect to a circumferential direction of the chamber, a circular shape having a circular first end diameter D1 that is between approximately 200 and 360 mm, and a circular second end diameter D2 that is between approximately 300 and 470 mm.

5. The chamber according to claim 1, wherein the second portion of the directing means has, with respect to a circumferential direction of the chamber, a substantially circular shape having a substantially circular first end with a diameter D1 equal to 220 mm, and a substantially circular second end with a diameter D2 equal to 360 mm.

6. The chamber according to claim 1, wherein the flow of heat-transfer fluid has a speed of 20 m/s at the outlet of the circulation blower.

7. The chamber according to claim 1, wherein the flow of heat-transfer fluid has a speed of between 6 and 7 m/s in the internal cavity of the tire.

\* \* \* \* \*